Figure 1:
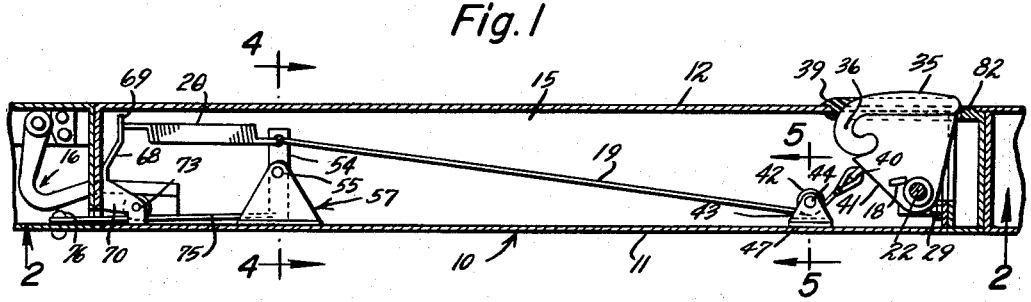

March 29, 1966 L. R. LOUGHARY ET AL 3,243,222
RETRACTING DOOR BUMPER FOR VEHICLES
Filed Sept. 27, 1963
2 Sheets-Sheet 1

INVENTORS
Lowell R. Loughary
Roy G. Loughary
BY John A. Mackinney
ATTORNEY

March 29, 1966   L. R. LOUGHARY ET AL   3,243,222
RETRACTING DOOR BUMPER FOR VEHICLES Filed Sept. 27, 1963   2 Sheets-Sheet 2

INVENTOR
Lowell R. Loughary
Roy G. Loughary

BY John A. Mawhinney

ATTORNEY

United States Patent Office 3,243,222
Patented Mar. 29, 1966

3,243,222
RETRACTING DOOR BUMPER FOR VEHICLES
Lowell R. Loughary and Roy G. Loughary, both of
P.O. Box 6727, Portland 66, Oreg.
Filed Sept. 27, 1963, Ser. No. 312,193
9 Claims. (Cl. 296—44)

The present invention relates to a Retracting Door Bumper For Vehicles, such as, automobiles and the like, and has for an object to provide a device of this type the major portion at least of which is held in an inoperative retracted position within the confines of the vehicle door but which upon the opening movement of the vehicle door will be automatically projected exteriorly of the door to protect the edge of the door and adjacent portions thereof from becoming pitted, marred or scratched by striking against an adjacent object, such as, a wall or an adjacent vehicle.

The present invention will be very useful and advantageous in protecting not only the vehicle upon which it is mounted but also adjacent vehicles which are parked in a parking lot or building since as soon as the door of the vehicle equipped with the present invention is opened the bumper is automatically projected and if the door is opened far enough to strike the next adjacent vehicle the bumper will engage the adjacent vehicle rather than the sharp edge of the door which is being opened. In this manner the body or doors of the adjacent vehicle will be protected from becoming pitted, marred or scatched by the door of the vehicle equipped with the present invention striking thereagainst.

Another object of the present invention is to provide a device of this character in which positive means are provided for holding the bumper in its retracted position when the door of the vehicle is closed, means for rendering the holding means inoperative as soon as the door begins its opening movement and positive means for automatically and immediately projecting the bumper to its operative position exteriorly of the door.

A still further object of the present invention is to provide a retracting door bumper for vehicles which can be mounted completely within the confines of the door structure with very slight modification of the conventional automobile door structure.

The present invention aims to provide a bumper of this type having a replaceable resilient element which can easily and quickly be removed when it becomes worn out, soiled or hardened, and replaced by a fresh resilient element.

In one of its broadest aspects the present invention contemplates the provision of a retracting door bumper for vehicles comprising a bumper adapted to be mounted on a door of the vehicle for movement between an inoperative retracted position within the confines of the door and an operative projected position exteriorly of the door to protect the edge portion of the door from striking an adjacent object, means operatively connected to the bumper for holding the bumper in its retracted position and means operatively connected to the bumper for projecting the bumper to its operative position.

More specifically, the present invention contemplates the provision of a retracting door bumper for vehicles comprising a bumper adapted to be mounted on a door of the vehicle for movement between an inoperative retracted position within the confines of the door and an operative projected position exteriorly of the door to protect the edge portion of the door from striking an adjacent object, means operatively connected to the bumper for holding the bumper in its retracted position and means operatively connected to the bumper for projecting the bumper to its operative position, said bumper holding means comprising a pivotally mounted member, a coil spring having one end connected to the door and its other end connected to said member on side of the pivot of said member and a cable having one end connected to said member on the same side of the pivot of said member as that on which the coil spring is connected and its other end secured to the bumper so that the coil spring moves the member to a position in which the cable is pulled in a direction to retract the bumper, a second cable having one end secured to the door frame and its other end secured to said member on the side of the pivot thereof opposite to that on which the coil spring is secured, the length of the second cable being such that it is slack to provide play and thus exerts no pull on said member while the door is closed but, while the door is being opened, will exert a pull on said member in a direction to overcome the force of the coil spring on said member and move said member so that slack is induced in said first cable and the means for projecting the bumper to its operative position comes into play.

A still further object of the present invention is to provide a device of this kind in which the bumper is automatically moved towards its projected operative position as soon as the initial opening movement of the door is effected so that it does not require that the door be swung to its fully opened position in order to have the bumper move to its fully projected position.

The present invention is of such a nature that it can be easily and quickly installed on vehicle doors of vehicles which are already in service or it can be incorporated into the door structure at the time the vehicle is being manufactured.

Other objects, features and advantages of this invention will be apparent from the following description when considered together with the accompanying drawings.

Figure 2:
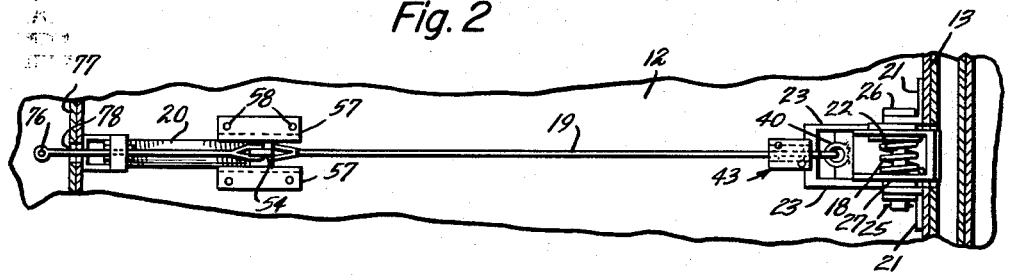
Figure 3:
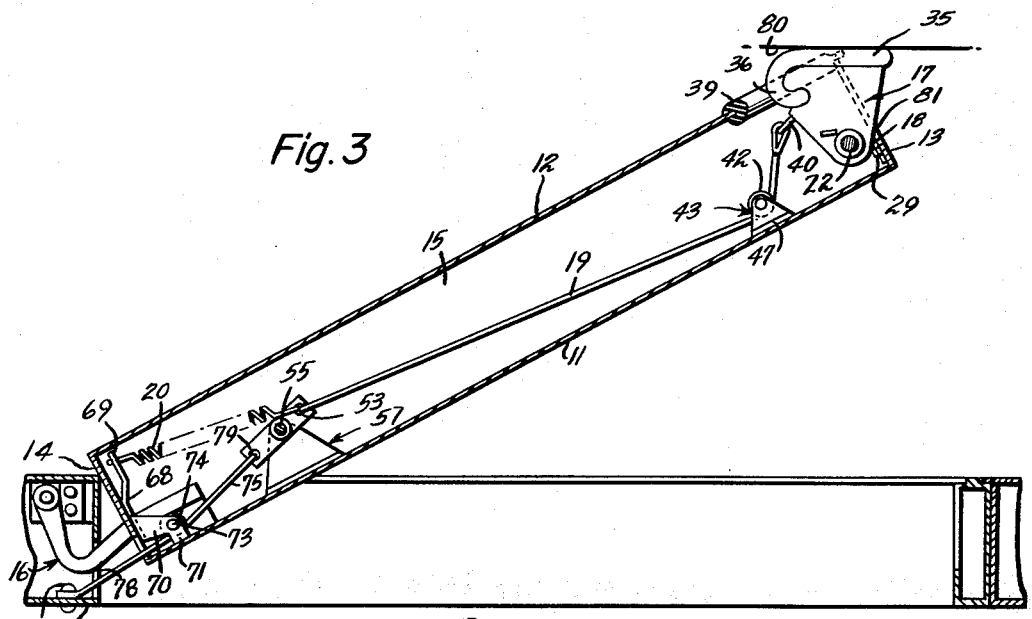
Figure 12:
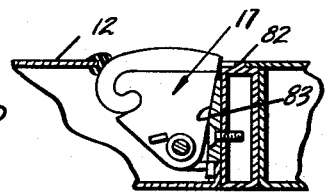
Figure 4:
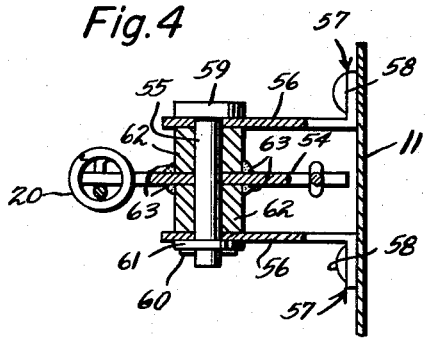
Figure 5:
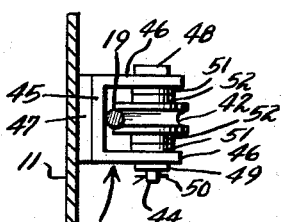
Figure 6:
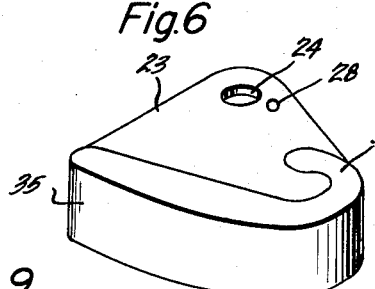
Figure 8:
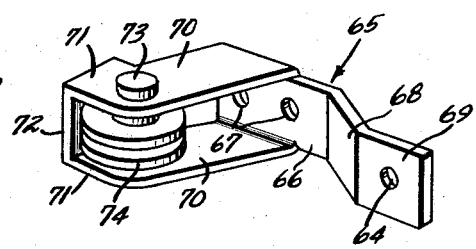
Figure 9:
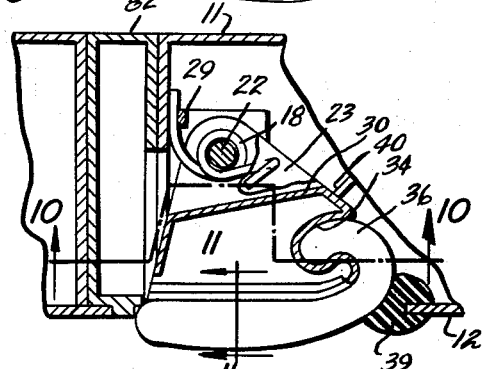
Figure 7:
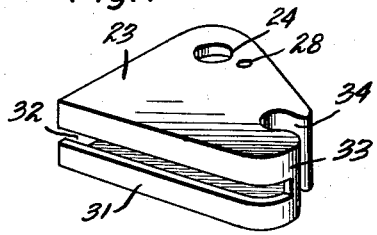
Figure 10:
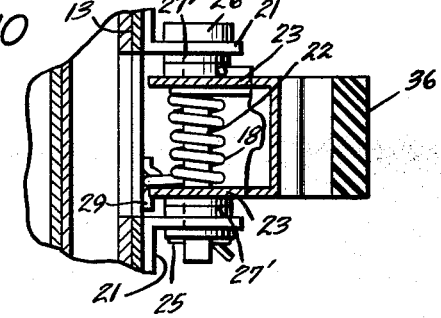
Figure 11:
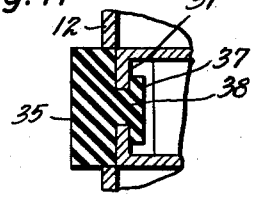

In the drawings, wherein like reference numerals denote corresponding parts throughout the several views:
FIGURE 1 is a longitudinal sectional view of a vehicle door and its adjacent door frame structure in closed position and with a device constructed in accordance with the present invention applied to the door,
FIGURE 2 is a view taken along the line 2—2 of FIGURE 1,
FIGURE 3 is a view similar to FIGURE 1 but showing the door in its opened position with the bumper in its operative projected position,
FIGURE 4 is a sectional view taken along the line 4—4 of FIGURE 1,
FIGURE 5 is a sectional view taken along the line 5—5 of FIGURE 1,
FIGURE 6 is a perspective view of the bumper element,
FIGURE 7 is a view similar to FIGURE 6 but with the resilient member of the bumper element removed therefrom,
FIGURE 8 is a perspective view of the bracket for holding one of the guide pulleys and forming an anchor for the coil spring,
FIGURE 9 is an enlarged sectional view of the free end of the door and showing the bumper member in its closed position with parts broken away and parts in section,
FIGURE 10 is a sectional view taken along the line 10—10 of FIGURE 9,
FIGURE 11 is a sectional view taken along the line 11—11 of FIGURE 9, and
FIGURE 12 is a fragmentary longitudinal sectional view of the structure shown at the right-hand end of FIGURE 1, and showing a modified form of the invention.

Referring more particularly to the drawings, 10 generally indicates an automobile door having an inner wall 11, an outer wall or panel 12, a free end wall 13 and a hinged end wall 14 and a bottom wall 15. The door 10 is mounted for swinging movement from its closed position illustrated in FIGURE 1 to its open position shown in FIGURE 3 in the conventional door frame by means of a conventionally mounted hinge means generally indicated at 16.

The retracting door bumper of the present invention comprises a bumper member 17 which is urged to its operative projected position by a coil spring 18 and is moved to its inoperative retracted position by a cable 19 under the influence of a coil spring 20. The bumper member 17 is pivotally supported in a recess formed in the free end portion of the door 10 into which recess it is free to move in and out of by cutting away a portion of the outer panel 12 and the free end wall 13. The bumper member 17 is pivotally supported by a pair of substantially L-shaped brackets 21 which may be secured to the inner face of the free end wall 13 by welding, rivets or the like. The brackets 21 are each secured by one leg to the end wall 13 and the free legs of the brackets are positioned in opposed spaced-apart relation and have alined openings therein for the reception of a pivot pin 22.

The bumper member 17 is provided with spaced-apart side walls 23 having alined openings 24 through which the pivot pin 22 passes. The pivot pin 22 is retained in proper position by a cotter pin 25 which extends through an opening formed in one end portion of the pivot pin and an enlarged head 26. A washer 27 is interposed between the cotter pin and the apertured leg of the adjacent bracket 21. For maintaining the bumper member 17 against axial movement on the pin 22, spacers 27' are interposed between the side walls 23 of the bumper member 17 and the apertured legs of the adjacent brackets 21. The coil spring 18 encircles the intermediate portion of the pivot pin 22 between the walls 23 of the bumper member 17 and one end portion of the spring 18 extends through an opening 28 formed in one side wall 23 of the bumper member 17 adjacent the opening 24 therein, and the opposite free end portion of the spring 18 bears against and is held captive by a projection 29 secured to the inner face of the free end wall 13 of the door 10 so that the coil spring 18 tends to move the bumper member 17 to its operative projected position as illustrated in FIGURE 3 of the drawings.

The side walls 23 of the bumper member 17 are held in their spaced-apart parallel relation by a hollow bracing member 30, the outer wall 31 of which is provided with an opening 32 which extends the full length of the outer wall 31 and one end of which opens through the end of the wall 31. The opposite end of the outer wall 31 is curved inwardly as indicated at 33 and terminates in an inwardly curved socket or recess 34. The opening 32 continues for a short distance into the curved end 33 of the wall 31 as can be seen from FIGURES 7 and 9 of the drawings. A removable resilient bumper element 35 is detachably mounted on the bumper member 17. The bumper element 35 may be made of any suitable material which will serve as a cushion or bumper should the door be swung to its open position towards an adjacent object such as a wall or another vehicle and may be made of rubber, or foam rubber or other suitable material for this purpose.

As can be seen from FIGURES 6 and 9 of the drawings the bumper element 35 is substantially straight through the major portion of its length and is provided at one end thereof with a substantially curved or arcuate portion 36. The bumper element 35 is also provided with an enlarged head 37 which is connected to the main body portion of the element 35 by a neck 38. The head 37 and the neck 38 of the element 35 extend throughout the entire straight portion of the element 35 and partially into the curved portion 36 as can be seen from FIGURE 9 of the drawings. The neck 38 of the element 35 is received by the opening 32 formed in the outer wall 31 of the hollow bearing member 30 and the head 37 is confined behind the portions of the outer wall 31 which define the opening 32 as can be seen from FIGURE 11 of the drawings.

The resilient bumper element 35 can be mounted on the bumper member 17 by flexing the curved portion 36 of the element 35 so that it is in substantial alinement with the main body portion of the element 35 and the element 35 is then introduced into the bumper member 17 by inserting the neck portion 38 into the opening 32 of the wall 31 with the head 37 engaging behind the portions of the wall 31 which define the opening 32. The insertion is made from the end of the member 17 opposite from the curved end 33 of the wall 31. As the curved portion 36 of the element 35 approaches the curved end 33 of the wall 31, the curved portion 37 due to its resiliency will accommodate itself to the curved portion 33 and the free end portion of the curved portion 36 of the element 35 will be received by the socket 34 and the element 35 will then be disposed in the position shown in FIGURES 6 and 9 of the drawings.

In order to remove the element 35 from the bumper member 17 when the element 35 has become worn or otherwise unuseable, the curved portion 36 of the element 35 will be withdrawn from the socket 34 and the element then slid along the front wall 31 in a direction away from the curved end 33 of the wall 31 until the neck 38 and head 37 of the element 35 are free of the opening 32 and wall 31.

A sealing member 39 which may be made of rubber or foam rubber or the like is secured to the edge of the panel 12 which in part defines the recess which receives the bumper member 17 when the door is in closed position. This sealing member 39 cooperates with the curved portion 36 of the bumper element 35 when the door is in its closed position as shown in FIGURE 1 of the drawings and in cooperation with the element 35 sets up a seal which is waterproof and dustproof to prevent the entrance of any extraneous matter into the interior of the door 10.

The cable 19 is flexible and has one end secured to an eyelet 40 which in turn is secured to an inner wall 41 of the member 17. The cable 19 is entrained and guided by a pulley 42 which is rotatably mounted in a bracket or pedestal 43 by means of an axle in the form of a pivot pin 44. The bracket 43 is substantially U-shaped having a base 45 and a pair of spaced-apart substantially triangularly shaped legs or sides 46. The base 45 of the bracket 43 is secured in any suitable manner as by welding or the like to a supporting plate 47 which is in turn secured in any suitable manner as by welding or the like to the inner wall 11 of the door 10.

The legs or sides 46 of the bracket 43 are provided with alined apertures and the axle or pivot pin 44 extends through these alined apertures and through the opening in the pulley 42. The axle 44 is restrained against axial movement by its head 48 which bears against the outer face of one of the legs 46 of the bracket 43 and a washer 49 which is held in contact with the outer face of the other leg 46 of the bracket 43 by a cotter pin 50. The pulley 42 is restrained against axial movement by means of washers or spaces 51 which bear against the inner faces of the adjacent legs 46 of the bracket 43 and against opposite faces of the hub 52 of the pulley 42.

The cable 19 extends from the pulley 42 towards the hinged end wall 14 and has its free end secured in an opening 53 formed adjacent one end of a link or lever 54 which is pivotally mounted intermediate its ends on an axle or pintle 55 which is in turn supported by the opposed spaced-apart legs 56 of L-shaped brackets 57. The brackets 57 are secured by rivets 58 or the like to the inner face of the inner wall 11 of the door 10. The legs 56 of the brackets 57 are substantially triangularly shaped and each leg 56 is provided with an opening adjacent the apex thereof through which the axle 55 extends as can be seen from FIGURE 4 of the drawings.

The axle 55 is restrained against axial movement by an enlarged head 59 which engages the outer face of one of the legs 56 of the brackets 57 and a cotter pin 60 which extends through an appropriate opening in the end of the axle 55 remote from the head 59 and which retains a washer 61 in engagement with the outer face of the leg 56 of the other bracket 57. The link 54 is positioned substantially midway between the legs 56 of the brackets 57 and is retained in this position by spacers 62 to which the link 54 is secured as by welding 63 or the like. The spacers 62 embrace the axle 55 and are freely rotatable thereon and the spacers 62 engage the inner faces of the legs 56 of the brackets 57.

One end of the coil spring 20 is secured in the opening 53 of the link 54 and the opposite end of the coil spring 20 is secured in an opening 64 of a bracket generally indicated at 65. As can be seen more particularly from FIGURES 1, 3 and 8, the bracket 65 is provided with an attaching portion 66 having holes 67 for the reception of rivets or the like by means of which the bracket 65 is secured to the end wall 14 of the door 10. Extending outwardly from the attaching portion 66 is an inclined portion 68 which terminates in an offset end portion 69 in which the opening 64 is formed. Extending inwardly from and at a slight inclination to the attaching portion 66 are a pair of side pieces 70 which terminate in angled portions 71. The angled portions 71 are bridged and connected by a crosspiece 72 which when the bracket 65 is secured to the end wall 14 of the door 10 abuts against the inner face of the inner wall 11 of the door adjacent the end wall 14 thereof. At their point of juncture the side pieces 70 and the angled portions 71 are provided with alined openings through which extends an axle or pivot pin 73 which is retained against axial movement in the same manner as the axle or pintle 55 described above. A pulley 74 is rotatably mounted on the axle 73 and is restrained against axial movement on the axle 73 in the same manner as is the axle 44 described above and illustrated in FIGURE 5 of the drawings.

A flexible cable 75 has one end secured as by rivet 76 or the like to a jamb 77 of the door 10 adjacent the hinged end wall 14 of the door. The cable extends from the rivet 76 through an appropriate opening 78 in the jamb 77 and extends over the pulley 74 and has its opposite free end secured in an opening 79 formed in the link 54 on the opposite side of its pivot 55 to that on which the coil spring 20 and the cable 19 are secured.

In use of the device it will be mounted on the interior of the door 10 as described above preferably about twelve inches below the door handle near the widest area of the car body or door. When the door 10 is in its closed position as illustrated in FIGURE 1 of the drawings, the coil spring 20 exerts a pulling force on the upper portion of the link or lever 54 so as to exert a pulling force on the cable 19 in a direction to retract the bumper member 17 into the recess formed in the free end portion of the door by cutting away a portion of the outer wall or panel 12 and free end wall 13. This pulling force exerted by the coil spring 20 is of sufficient strength to overcome the force of the coil spring 18 which is designed to move the bumper member 17 to its operative projected position shown in FIGURE 3 of the drawings.

However, when the door is moved towards its open position illustrated in FIGURE 3 of the drawings, the cable 75, the length of which cannot be increased to any substantial extent, will exert a pulling force upon the lower portion of the link or lever 54 since one end of the cable 75 is secured to a fixed part of the vehicle. This pulling force exerted by the cable 75 upon the link 54 overcomes the strength of the spring 20 and moves the link 54 to the position illustrated in FIGURE 3 so that slack or play is induced in the cable 19 and the pulling force of the cable 19 is eliminated. This elimination of the pulling force of the cable 19 will permit the coil spring 18 to exert its projecting force upon the bumper member 17 so as to move it to a position illustrated in FIGURE 3 into engagement with an adjacent object 80, such as, a wall or part of an adjacent vehicle, with the resilient bumper element 35 engaging such object. This prevents the edge of the door striking such object 80 and marring or scratching either the door or the object. Of course the engagement of the object 80 will restrict the projection of the bumper member 17.

In the event there is no obstacle 80 against which the bumper member 17 will engage the outwardly projected movement of the member 17 will be restricted by the adjacent edge of the free end wall 13 as indicated at 81 against which the leading edge of the element 17 will abut, and also the outwardly projected movement of the member 17 will take up the slack in the cable 19 so that the cable 19 by virtue of the force exerted thereon by the spring 20 will also limit the outward movement of the member 17 when the door is swung towards its fully open position when an object such as 80 is not encountered.

As the door is swung from its open position illustrated in FIGURE 3 to its closed position shown in FIGURE 1 of the drawings, slack or play will be induced in the cable 75 so that the force of the coil spring 20 will again come into play to swing the link 54 in a counterclockwise direction looking at FIGURES 1 and 3 of the drawings so as to exert a pull upon the cable 19 which in turn will exert a pull upon the bumper member 17 to retract it to its fully closed position as shown in FIGURE 1 of the drawings.

It wil be noted from FIGURE 1 of the drawings that the resilient bumper element 35 presses against the resilient sealing member 39 so that these two parts will set up a watertight dustproof seal for the recess formed in the interior of the door 10 so as to preclude any moisture or extraneous dirt or the like from entering within the interior of the door.

It will also be noted that the resilient bumper element 35 and the resilient sealing member 39 will cooperate with one another to serve as a cushion for preventing any abrupt engagement of the bumper element 35 against the metal edge of the panel 12. It will not only prevent any undesirable noise but will also protect the bumper element 35 from being cut or disfigured by the sharp edge of the panel 12 where it has been cut away to provide the recess for the bumper 17. For this reason it is very desirable and advantageous that both the resilient bumper element 35 and the sealing member 39 be removable and replaceable so as to perpetuate this tight sealing and avoidance of noise and damage to the element 35.

On some vehicles the cables 19 and 75, the pulleys 42 and 74, the link 54, the coil spring 20 and the bracket 65 could be eliminated. In this case a striker plate 83 is employed adjacent the free end wall 13 of the door which would engage the leading edge of the bumper member 17 as the door is moved to its closed position so that the striker plate 83 would cam the member 17 to its retracted inoperative position against the opening action of the spring 18 as shown in FIGURE 12 of the drawings.

While we have described preferred embodiments of our invention, it is understood that this disclosure is for the purpose of illustration and that various omissions, or changes in arrangement of parts, as well as the substitution of equivalent elements for those herein shown and described, may be made without departing from the spirit and scope of the invention as set forth in the appended claims.

What we claim is:

1. A retracting door bumper for vehicles comprising a bumper mounted on a door of the vehicle for movement between an inoperative retracted position and an operative projected position exteriorly of the door to protect a portion of the door from striking an adjacent object, means operatively connected to the bumper for holding the bumper in its retracted position, means operatively connected to the bumper for projecting the bumper to its operative position, said bumper holding means comprising a pivotally mounted member, a spring having one end connected to the door and its other end connected to said member on one side of the pivot of said member and a draw element having one end connected to said member on the same side of the pivot of said member as that on which the spring is connected and its other end secured to the bumper so that the spring moves the member to a position in which the draw element is pulled in a direction to retract the bumper, said means for overcoming the force of said bumper-holding means comprising a second draw element that has one end secured to the door frame and its other end secured to said member on the side of the pivot thereof opposite to that in which the spring is secured, the length of the second draw element being such that it exerts no pull on said member while the door is closed but while the door is being opened will exert a pull on said member in a direction to overcome the force of the spring on said member and move said member so that play is induced in said first draw element and the means for projecting the bumper to its operative position comes into play.

2. A retracting door bumper as claimed in claim 1, wherein said bumper holding means comprises a coil spring and a cable.

3. A retracting door bumper as claimed in claim 1, wherein the bumper is adapted to be pivotally mounted in a recess in outer edge portions of the vehicle door, and said means for projecting the bumper comprises a coil spring embracing the pivot of the bumper and having one end engaging the bumper and the other end adapted to engage the vehicle door.

4. A retracting door bumper as claimed in claim 3, wherein said bumper comprises a substantially triangularly shaped block having an opening in its apex portion for receiving a pivot pin by which it is adapted to be pivotally mounted in the recess in the vehicle door with the apex portion innermost and its base portion outermost, and a resilient element removably mounted on the base portion of said block and having a T-shaped head received by a correspondingly T-shaped slot in the block.

5. A retracting door bumper as claimed in claim 4, wherein said resilient element has an arcuate receding part and said block has a correspondingly shaped socket to receive said arcuate part of said element, said arcuate part of the resilient element is adapted to cooperate with a sealing member adapted to be fixed to an edge of the recess in the vehicle door to seal the recess against the entrance of moisture and extraneous matter at this point when the door is closed and the bumper is in its retracted position.

6. A retracting door bumper for vehicles comprising a bumper mounted on a door of the vehicle for movement between an inoperative retracted position within the confines of the door and an operative projected position exteriorly of the door to protect the edge portion of the door from striking an adjacent object, means operatively connected to the bumper for holding the bumper in its retracted position, means operatively connected to the bumper for projecting the bumper to its operative position, means for gradually and progressively overcoming the force of said means for holding the bumper in its retracted position as the door is being opened so that the means for projecting the bumper is only gradually and progressively permitted to come into play to project the bumper gradually and progressively to its operative position during the opening movement of the door, said bumper holding means comprising a pivotally mounted member, a coil spring having one end connected to the door and its other end connected to said member on one side of the pivot of said member and a cable having one end connected to said member on the same side of the pivot of said member as that on which the coil spring is connected and its other end secured to the bumper so that the coil spring moves the member to a position in which the cable is pulled in a direction to retract the bumper, said means for overcoming the force of said bumper holding means comprising a second cable that has one end secured to the door frame and its other end secured to said member on the side of the pivot therof opposite to that in which the coil spring is secured, the length of the second cable being such that it exerts no pull on said member while the door is closed but while the door is being opened will exert a pull on said member in a direction to overcome the force of the coil spring on said member and move said member so that slack is induced in said first cable and the means for projecting the bumper to its operative position comes into play.

7. A retracting door bumper as claimed in claim 6, wherein pulley means are provided for guiding said first cable, and second pulley means are provided for guiding said second cable.

8. A retracting door bumper as claimed in claim 6, wherein a bracket is adapted to be mounted on the vehicle door to which the said one end of the coil spring is secured.

9. A retracting door bumper as claimed in claim 6, wherein a pedestal is provided for pivotally supporting the pivoted member.

References Cited by the Examiner

UNITED STATES PATENTS

| 1,958,318 | 5/1934 | Selby | 16—86 X |
|---|---|---|---|
| 2,678,232 | 5/1954 | Barry. | |

BENJAMIN HERSH, *Primary Examiner.*

MILTON BUCHLER, *Examiner.*

P. GOODMAN, *Assistant Examiner.*